April 26, 1932.  R. E. MARINE  1,855,406
AUTOMOBILE CLOSURE
Filed Jan. 14, 1927   3 Sheets-Sheet 1

INVENTOR
Richard E. Marine

April 26, 1932.　　　R. E. MARINE　　　1,855,406
AUTOMOBILE CLOSURE
Filed Jan. 14, 1927　　　3 Sheets-Sheet 2

INVENTOR
Richard E. Marine

April 26, 1932.                R. E. MARINE                 1,855,406
                            AUTOMOBILE CLOSURE
                      Filed Jan. 14, 1927    3 Sheets-Sheet 3

Patented Apr. 26, 1932

1,855,406

UNITED STATES PATENT OFFICE

RICHARD E. MARINE, OF PITTSBURGH, PENNSYLVANIA

AUTOMOBILE CLOSURE

Application filed January 14, 1927. Serial No. 161,178.

My invention comprehends improvements in closures and in its more specific aspects comprehends improvements in closures for automobiles and like vehicles, particularly those of the so called open type.

This type of car possesses many recognized advantages, particularly for touring, over cars of the closed type such as healthful openness, freedom from the accumulation of noxious gases, better vision, lighter weight and lower center of gravity, giving greater safety in travel, better pick up and roadability, greater accessibility, greater ease in loading long or cumbersome articles, absence of hum, rattles and other noises. The open type has a large free space between the car top and each side and is normally run open, while the closed type has less free space due to the presence of posts and the use of higher sides in order to accommodate the storage of the windows therein, giving rise to eddies and drafts on the level of the occupant's head which are absent in the open type. The conditions inherent in the closed type therefore suggest the operation of the car closed and it is normally so operated, thus sacrificing one of the greatest benefits of motoring.

The open car has lost in popularity, however, due to the unsatisfactory character of its side closures and the difficulty and inconvenience of manipulating them in an emergency. For instance, where the usual side curtains and separate door rods or posts movable with the car doors are employed, it is necessary, for storage purposes, to separately remove each closure, fold, and place it in storage and then remove and dispose of the door rods or posts, usually in some inaccessible place where the windows are liable to be cracked or torn, and when again mounting the closure there is confusion as to the proper location of the several parts and great wear and tear results, so that after a short while they become dilapidated. They are therefore frequently not used when needed.

It has been proposed to store the closures on spring rollers, or otherwise, in the car top from which location they could be lowered into operative position. These systems have possessed the inherent defect that they require special manipulating, e. g. raising and lowering of the closure, each time an occupant of the car desires to open a car door, and where through inadvertence the occupant fails to perform such operation preliminary to opening the car door, the closure is usually jammed and becomes damaged, necessitating repairs.

The known expedient of having the door closure section open and close with the car door did not lend itself to use in these systems because to be freely movable with the car door, the door closure section when lowered must not be restrained by connections with storage instrumentalities in the car top. Furthermore, such lowered door closure section is required to be maintained in vertical position on the car door by a rigid upright rod or post attached thereto or similar rigid instrumentality and this was not adapted to be moved with the closure, longitudinally, through curved guideways or about rollers under the car top. The prior art therefore failed to appreciate the possibility of, suggest or teach a door closure section movable when lowered with and as a rigid part of the car door and also capable of being raised by simple sliding operation into storage into the car top.

By my invention I overcome all of the disadvantages enumerated, and others, of prior systems and provide closures for the sides of open cars operable in the manner last indicated and capable of manipulation with substantially the same facility as the closures of closed cars.

In broad aspect, my invention comprehends, in combination with a car having unrestricted free space on each side, closures for said space each movable by a single simple sliding operation from storage to operative position to effect a contacting weather-tight seal between themselves, the door closures being freely movable when in such position with and as a rigid part of the car doors.

In another aspect my invention comprehends a closure with storage in the car top and control instrumentalities associated therewith whereby by the simple operation of pulling the closure down into engagement with the car door, or door and body panel, the closure, or at least the car door portion thereof, becomes freely movable with the car door, unrestrained by connections with the car top, the closure being returnable to storage position by a simple lifting operation.

The broad conception of my invention may be practiced in a variety of ways. For instance as illustrative examples and as more specific aspects of my invention I may employ, even where there are two doors on each side of the car, a single closure unit, or I may employ two or more closure units, preferably overlapping. Each unit may comprise a main portion attachable to the stationary portions of the car side and a door portion or portions rigidly attachable to and movable with the car door or doors, both portions preferably being movable together into storage position. To this end there is preferably provided means for fastening or locking the main and door portions together when it is desired to move them into storage position. Or, again the door closure portion alone may constitute an entire closure unit movable by simple operation of raising and lowering into storage and operative positions respectively. In the latter case means are preferably provided for hingedly supporting the top of the closure in alignment with the door hinges and means are also preferably provided for restraining the forward edge of the closure, though permitting the opening thereof with the car door, both means advantageously serving to direct the door closure, when lifted, into storage position.

When flexible closures are employed both the main and door portions thereof may advantageously be reinforced by stiffening frames or bars of resilient material, such for instance as spring metal. These portions may, conveniently, be hinged together through said frames and when moved to storage position said portions are also preferably locked together there-through to insure a rigid connection and to constitute in effect an integral structure which may conveniently be of sufficient strength to resist doubling up or jamming when the closure is pushed upwards into storage position. The frame should be sufficiently flexible to enable the closure to pass along the curved pathways but capable of frictionally retaining it in storage position.

Where flexible closures are employed my invention further comprehends means for maintaining the closure, when lowered, in rigid upright position. An important feature of my invention is the provision of means attached to and movable with the flexible closure itself in a curved pathway into storage position and from storage position into operative position and in the latter position supporting said closure in substantially rigid upright position. Such means may be employed with any of the closures to prevent gaping of their edges resulting in an imperfect weather seal but is of particular utility when employed with closures movable with the car doors. This means may take many forms and among those invented by me are: a normally flexible rod attached to the closure along the free vertical edge of the latter, said rod being rendered substantially rigid either by the act of attaching its lower end to the car door, or side, or by independent manipulation; a rigid rod pivoted at one end near the upper free edge of the closure and held in horizontal position across said closure for movement into storage position or turned to vertical position and attached to the car door when lowered to operative position; a rod, attached along the free vertical edge of the closure, of sufficient flexibility to bend in passing longitudinally thru a curved pathway into storage position but sufficiently rigid to hold said closure by friction in storage position or to hold it substantially rigid in vertical position when attached to the car door, such rod or rods being independent or conveniently forming the end member or members of the closure frame; or, again, the rod may be made of sections with spring hinges between them of such strength as to effect the same results as in the preceding example. It is obvious that other variations of my fundamental conception, of which those given are illustrative, may be employed within the spirit of my invention.

Where a main closure portion is employed with a door closure portion to form a closure unit, my invention further contemplates the advantageous retention of the top edge of the main closure portion at the bottom of the guideways, as by means of stops or ledges, the lower edge of said portion being attached to the car side and as a further feature of my invention resilient means may be employed to hold the closure taut, as for instance a resilient supporting ledge or a resilient beading along the upper edge of said main closure portion. Or, if desired, spring rollers for tensioning the closure when locked down and for retracting the closure when released may be provided in the car top, these being particularly useful when flexible closures not provided with resilient reinforcing frames or bars are employed.

As a further feature of my invention I may employ a compartment specially designed to fit in the car top and to contain the side closures for the car, such compartment advantageously being readily attachable and detachable and preferably made of light, thin, rigid, smooth material susceptible of a rich finish, such as aluminum and its alloys, thin sheets of fabric impregnated with stiffening compound such as a phenol condensation product, hard rubberized fabric, or other similar material preferably waterproof, the units being capable of separate manufacture and sale and being easily installed by the user. The sheet material may be corrugated substantially at right angles to any line of bend that may tend to develop where necessary to insure the desirable lightness together with the required stiffness. The compartment in effect constitutes a second or inner top insulating against heat and deflecting any leakage that may occur thru the outer top. Since the closures are fitted to and form a part of the compartment, a close fit between them is assured and the necessity of fitting the closures to the outer top—often an awkward and unsatisfactory proceeding—is obviated.

My invention further contemplates making the compartment into sections, when desired, each section containing its appropriate closure unit. The sections, preferably, overlap to effect an overlapping of the closures and interlock to prevent displacement in case of shock and are adapted by simple adjustment in the top to be automatically locked therein. Should it be desired to lower the top the sections are easily and quickly removed and as an additional feature of my invention I further provide for nesting and storing them in a pocket or pockets in the casing employed to cover the lowered top.

My invention further consists in such other new and useful improvements, and has for further objects such other operative advantages or results, as are found to obtain in constructions hereinafter described or claimed.

In the accompanying drawings, forming a part of this specification, and showing for purposes of exemplification, preferred forms and manners in which the invention may be embodied and practised but without limiting the claimed invention to such instance or instances:

Fig. 2 is a side elevation, in partial perspective, showing in full lines a form of my closure frames and in dotted outline the closures proper.

Fig. 2ª is a section on the line 2ª—2ª of Fig. 2 showing a method of securing the waterproof flexible material to the frame.

Fig. 2ᵇ is a section showing a modification in which the waterproof flexible material is dispensed with, a metallic frame, only, being employed for retaining the window.

Fig. 2ᶜ (Sheet 3) is a section on the line 2ᶜ—2ᶜ of Fig. 2 showing the preferred manner of attaching the folding windshield closure extension.

Figs. 3 and 3ª are elevations partially in section of the shell and core respectively of one form of flexible-rigid closure supporting rod devised by me.

Fig. 4 is a horizontal section on the line 4—4 of Fig. 3.

Figs. 5 and 5ª are views similar to Figs. 3 and 3ª, but showing a modified form of flexible-rigid rod.

Fig. 6 is a vertical section of a further modified form of rod.

Fig. 7 is a horizontal section on the line 7—7 of Fig. 6.

Fig. 8 is a fragmentary vertical section of a further modified form of rod.

Fig. 9 is an elevation of a closure frame provided with a folding door closure supporting rod, viewed from the inside.

Figs. 10, 11 and 12 are side elevations of modified forms of closure frames.

Figs. 12ª, 12ᵇ, 12ᶜ and 12ᵈ are sections on the lines 12ª, 12ᵇ, 12ᶜ and 12ᵈ respectively of Fig. 12.

Fig. 13 is an elevation of a closure frame whose end members are adapted to serve as door closure supporting rods.

Fig. 14 is a vertical section of a car top provided with guideways and a closure of the character shown in Fig. 13.

Figs. 15, 15ª, 15ᵇ, and 15ᶜ are, respectively, an elevation, a vertical section, an enlarged fragmentary elevation and a horizontal section of a closure frame made of hinged sections.

Figs. 16 and 16ª are, respectively, a fragmentary elevation and a vertical section on the line 16ª of Fig. 16 of a modified form of closure.

Figs. 17 and 17ª are respectively a vertical section and a perspective of a locking device for securing closure sections together.

Figs. 18, 18ª, 18ᵇ and 19 are vertical sections showing different ways of resiliently supporting a closure.

Fig. 20 shows a fragmentary elevation of a closure frame with beading flattened at one end.

Figs. 21 and 21ª show in perspective different forms of closure compartments.

Fig. 22 shows the inverted ledges of a closure compartment.

Fig. 23 is a section on the line 23—23 of Fig. 22.

Figs. 24 and 25 are respectively a vertical section showing the use of spring rollers to tension and retract the closures and a fragmentary plan view of the same.

Fig. 26 is a vertical section showing superposed guideways for relatively narrow tops.

Fig. 27 is a vertical section showing the closure compartment made in three overlapping sections.

Fig. 28 and 29 are respectively a top plan view and a vertical section on the line 29—29 of Fig. 28, of a modified form of sectioned closure compartment.

Figs. 30 and 31 are respectively a detail and a transverse vertical section of a catch for securing the compartment in the top, the compartment being omitted in Fig. 30.

Similar reference characters refer to similar parts throughout the several views.

Figure 1:
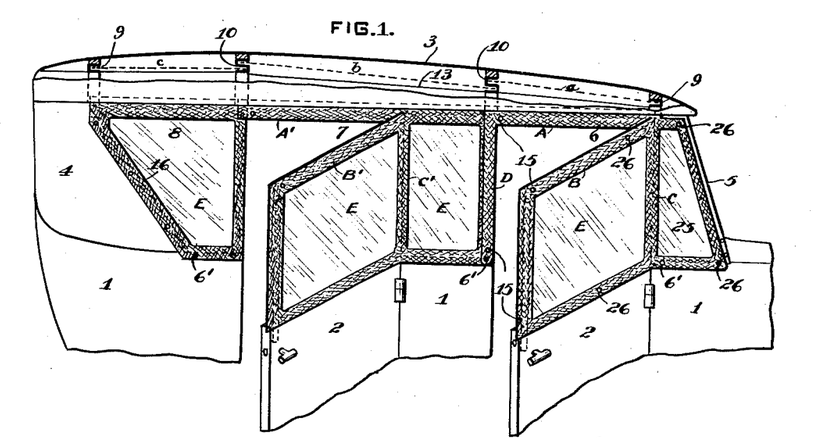
Fig. 1 is a fragmentary perspective view, partially in section, showing one form of my closures applied to a car.

In Figure 1 are shown the stationary side panels 1, doors 2, top 3, permanent rear closure 4, and windshield 5.

Figures 2, 2A, 2B, 3, 3A, 4, 5, 5A, 6, 7, 8, 9:
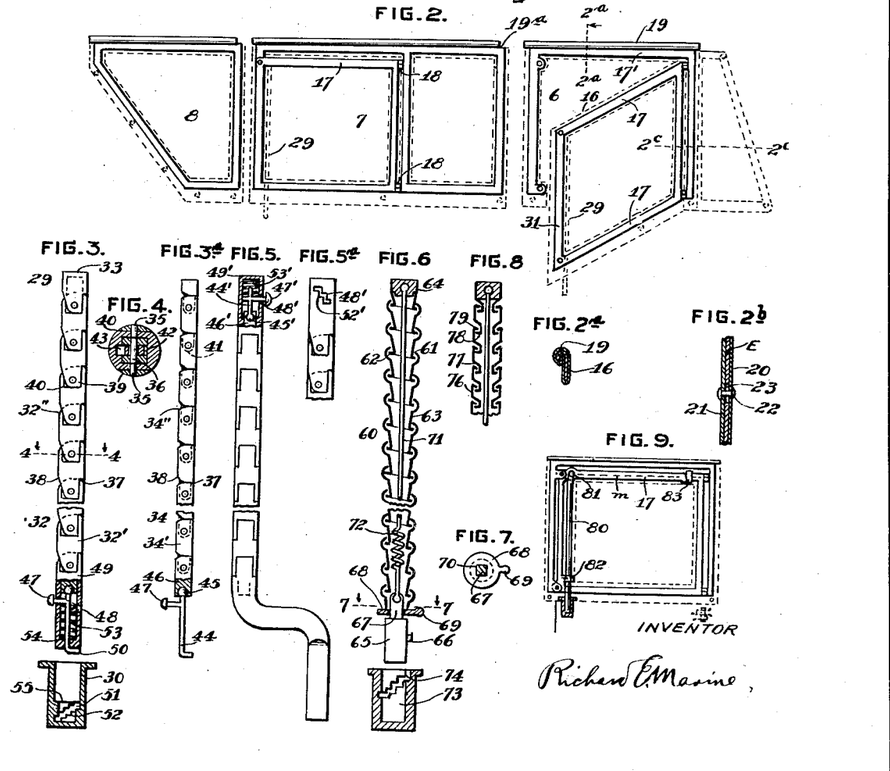
Figures 10, 11, 12, 12A, 12B, 12C, 12D, 13, 14, 15, 15A, 15B, 15C, 16, 16A, 17, 17A, 18, 18A, 18B, 19, 20:
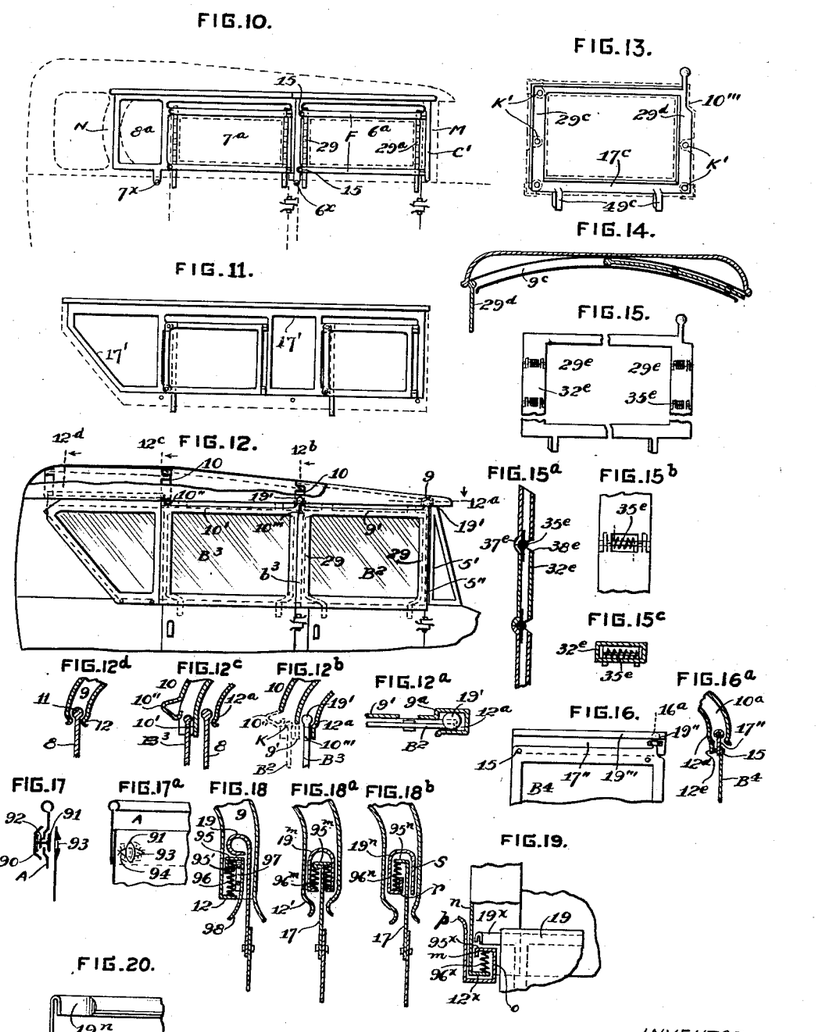
Figures 21, 21A, 22, 23, 24, 26, 27:
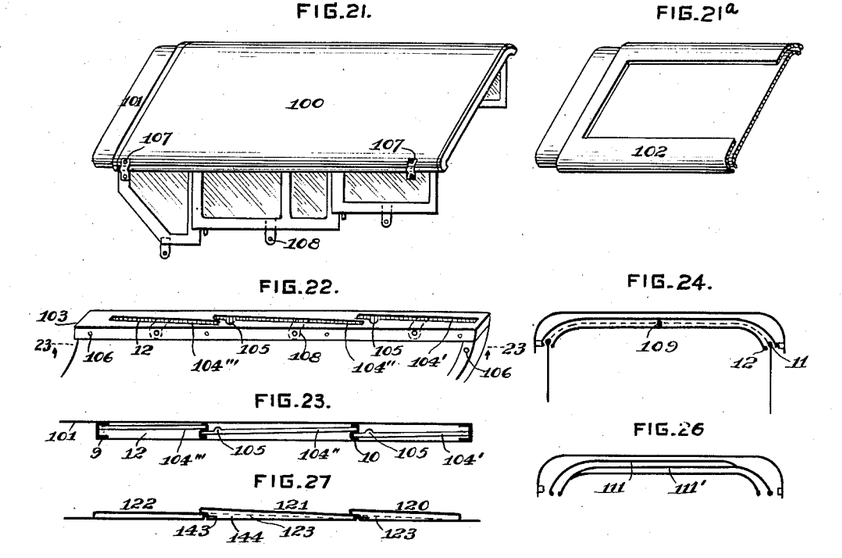

The closures for each side may be made in one or more units. As shown in Figures 1 and 2 they are made in three units per side indicated 6, 7 and 8 respectively. Each unit is adapted to slide in a pair of guides 9, 10; 10, 10; and 10, 9 respectively, in the top, their positions when raised being shown by dotted lines $a$, $b$ and $c$ in Figure 1. The guides of adjacent closures are superimposed and may be made as double guides as shown at 10, with guideways facing in opposite directions to effect an overlap of the closures. When raised to storage position the closures rest in the guides under the top and when lowered to operative position they are shown as supported by rods or enlargements 11 at their top which rest upon ledges 12 at the bottom of the guideways as illustrated in Figure 22, although it is obvious that they may be supported at their top in any other suitable manner as by end extensions (Fig. 19). A suitable lining 13 may be employed to conceal the storage space and prevent any tendency of the closure to buckle downwardly.

The side closure unit 6, in accordance with my invention, comprises a main or stationary portion A attachable to the car body at 6' and a door portion B adapted to open and close with the car door, the portions A and B being adapted to be firmly locked together at 15, to constitute in effect an integral unitary section, when it is desired to move the closure unit into storage position. The portions A and B are shown hinged together at one edge although it is obvious that they may be entirely separate but with overlapping edges, both edges being provided with means for firmly locking them together as a single unit when moved to storage position.

With this construction the main or inverted U-shaped portion constitutes essentially a framework about the door and presents an unbroken surface to the guides in the top, while the door portion firmly braces the legs of the U-shaped portion of the framework and maintains them a fixed distance apart in parallel relationship for passage through the guides. The construction has the further advantage that when the lower ends of the legs, C, D, of the main or U-shaped portion A are secured to the car body at 6' 6', both ends of the horizontal top member of the portion A are anchored down in proper position and are prevented from vibrating or becoming misplaced or working out of fit with respect to the door and since the downward movement of the horizontal top member is limited by the ledges 12 of the guides in the top, the U-shaped portion as a whole constitutes a taut framework at all times against which the door accurately fits when closed, sagging and misfits so frequently met with in closures of a flexible character being avoided throughout the lifetime of the closure.

The unit 7 is similarly constructed save that since the stationary portion A' thereof is braced by the rectangular frame or leg C', the leg at the free edge of the door has, for simplicity of construction, been omitted tho it may of course be employed if desired. It is of course obvious that the portion A of unit 6 might be similarly constructed in accordance with my invention, the leg D being omitted.

The door closure portions B, B', the closure unit 8 and the panel C' are each provided with windows E preferably of celluloid or other flexible material designed as large as is consistent with efficient wear and manipulation of the closures, and supported in a framework preferably of waterproof flexible material 16, as shown in Figure 1 and in dotted lines in Figure 2.

In order to stiffen the closure unit to facilitate manipulation—particularly where a spring roller is not employed—to give shape to the sides and to relieve the windows of strain, flexible elastic reinforcements 17 (Fig. 2), such as thin sheet steel or the like, are preferably employed both in the door and main frame constructions. While each edge may be provided with a separate reinforcement, or any edge reinforcement may be omitted as desired, it is preferable to make the reinforcements integral with each other where possible, in order to brace the unit as an entirety. For the same reason when it is desired to raise the closure it is preferable that the door closure portions B, B' be firmly locked to their respective main closure portions A, A', not only through their flexible binding but through the reinforcement members as well. To this purpose the door closure portions may be hinged at one side to the main closure portions—in addition to or instead of the ordinary hinged connection of flexible waterproof material—by metallic hinges 18 formed preferably from extensions of the sheet metal reinforcements. These may be omitted, however, where greater flexibility is desired. The locking devices 15 at the other side of the doors likewise preferably pass through the sheet metal reinforcements, or extensions therefrom, as shown, and firmly lock them together. The upper member 17' of the metal reinforcing frame of the main portion of each unit may conveniently be turned over at its free edge to form the beading 19 to stiffen the upper edge of the closure unit and to constitute the enlargement hereinbefore referred to for supporting the closure unit on the ledge 12 when lowered. The beading may be cut away at 19ª to permit the overlapping edges of adjacent closure to contact. It is of course obvious that a separate rod or enlargement may be employed. The fabric covering for the frame above the door may conveniently have its free edges clamped under the beading 19 as shown in Fig. 2ª. A similar construction may be employed at the upper ends of the stationary windows save that the lower end of the fabric should be split to take over the edge of the window to which the fabric is sewed.

In other constructions the covering may be dispensed with the flexible metal framework, while being kept as narrow as possible, being made of sufficient width to overlap at all free edges, including those at the hinges or the latter may extend along the entire edge; in such case the windows E of celluloid or the like may be yieldingly riveted between the metallic frame 20 and strip 21, of fabric or other material yieldable lengthwise as well as being flexible to permit bending of the frame without binding. The rivets 22 pass through enlarged slots 23 in the window material to permit it to slide slightly when flexed to prevent binding and tearing, as shown in Figure 2ᵇ.

Figures 2C, 25, 28, 29, 30, 31:
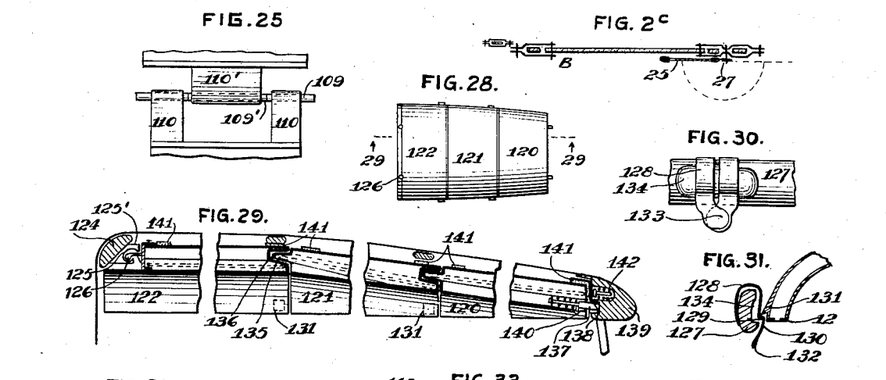

The forward closure unit 6 is provided with a hinged windowed extension 25 when needed which in its extended position shown in Figure 1 serves as a closure for the triangular space frequently found adjacent the windshield, and is adapted to be attached at its front edge to the latter in the usual manner as by snap fasteners. For storage purposes or to obtain ventilation the extension may be turned back against and secured to the main current unit 6 by a snap fastener 26 of the double snap type, that is—one adapted to snap to the side of the car body in its forward position and to the section 6 in its folded back position. A similar snap fastener may be provided at the top, if needed. A mode of connecting the extension to the main unit 6 so as not to increase the thickness or to decrease the flexibility of that portion of the edge of the unit which must slide in the curved guideway is shown in Fig. 2ᶜ (Sheet 3). It will be seen that the stitches 27, or other fastening means, are sufficiently remote from the edge of the unit to insure that the extension 25 when folded back will move entirely outside of the guideway 9.

A removable rigid rod may be employed for supporting the door closure portion upright when in operative position but this necessitates removal of the rod from the closure and separate storage and results in poor fits, sagging, worn out curtain pockets due to the cutting action of the frequently inserted metal rods, lost rods, inconvenience and loss of time, and as a further important feature of my invention I provide the free end of each door closure portion with a normally flexible rod 29 permanently attached thereto as near the free vertical edge as conditions will permit, said rod by flexing being readily movable with the closure in a curved pathway, but capable of being rendered rigid when the closure is lowered to operative position on the car door. This may be accomplished automatically by the locking of the lower end of the rod in the socket 30 in the car door. This rod may readily serve as the vertical spacing member at one end for the horizontal frame members 17 of the door frames, the end frame member 31 being dispensed with, the horizontal frame members being preferably welded or otherwise secured to the adjacent portions of the rod and extending beyond the same to carry the closure past the edge of the car door 2 to effect a weather overlap with the adjacent closure unit as shown in Figure 10. Where, however, a rod of the type shown in Figure 5 is employed it may be attached to the ends of the horizontal members 17 since the offset in the rod provides the necessary extension.

One form of rod of the character indicated is illustrated in detail in Figures 3, 3ª and 4. It is here shown as comprising an outer shell 32 closed at its top 33 and provided with an inner core 34, square in cross section, fitting snugly but freely slidable axially within a square channel extending longitudinally through the center of said rod. The core and channel may if desired be elliptical or any other configuration in cross section but preferably one which will prevent turning. Both the shell 32 and the core 34 are made of hinged sections 32' and 34', respectively, of equal length their respective hinge pintles 35—35, 36 being in substantial alignment when the core is in its raised position abutting against the top 33 of the shell. Under these conditions a shell—and corresponding core—section can turn together as if a single hinged section. The adjacent ends of adjacent sections of both shell and core are constituted of curved surfaces 32" and 34" on arcs of circles having their respective pintles as centers so that when the pintles are in alignment and a shell and core section is turned with respect to its neighbor about the aligned pintles the contacting end surfaces of the respective sections may freely slide circumferentially over each other about the common axis of their pintles. Stop shoulders are formed in the sections at 37 and the sharp corners at the lower ends of the curved surfaces of each shell and core section are cut away at 38, to permit the desired degree of turning. The hinge connection may be effected by cutting out, casting or otherwise forming opposite side extensions 39, on the lower end of each shell section, and seating the same in corresponding recesses 40 on opposite sides and at the upper end of the corresponding lower shell section, the pintles 35 passing freely through said extensions and being secured in the recess walls of the adjacent shell section, as shown in Figure 4. Similarly a central extension 41 on the lower end of each core section may seat in a central recess 42 in the upper end of the corresponding lower core section and a further recess 43 should be provided in the shell opposite the recess 42 in the core to provide space for the turning of the extension 41 when the rod is bent. When the core is lowered to carry its pintles 36 out of alignment with the pintles 35 of the shell the hinged joints of both the core and shell are locked and the rod becomes rigid. To accomplish the lowering of the core I provide a lock bolt 44 swiveled at its upper end at 45 in the lowermost section 46 of the core. This bolt is provided near its top with an operating handle 47 passing through an inclined slot 48 in the lowermost section 49 of the shell and at its bottom has a projecting locking lug 50 adapted to engage and turn in the inclined or spiral slot 51 in the door socket 30, the slot having preferably undulating surfaces 52 to hold the lug 50 in any adjusted position. A spring 53 is provided between the handle 47 and the shoulder 54 to normally force the core to its uppermost position to render the rod flexible. It is of course essential that the rod be rendered flexible in a path parallel to the curved guides 9, 10 in the top and accordingly the closure should be attached thereto in a plane at right angles to the paper in Figure 3 and preferably at the right of the rod so that the handle 47 will be on the inside of the car. The lower end of the rod is adapted to seat on the shoulder 55 in the socket 30 and each may be squared if desired to prevent turning as shown in Figure 5. The rod and its parts are preferably made of rigid light rustproof metal, rustproof steel or duralumin well satisfying these requirements.

In the operation of the closure, when it is desired to store the same, the door portions thereof are firmly locked to the main or stationary portions by the locks 15, the windshield portion 25, if employed, being turned back and snapped at 26 to the front door portion; the lug or latch 50 is then turned by the handle 47 out of engagement with the slot or groove 51 in the socket 30 in the top of the car door, thus rendering the rod 29 flexible, and the fasteners attaching the closures to the car body also being released the closure unit may be raised as a single integral structure into storage position being directed by the pair of guides 9, 10. The steel reinforcing frames 17 lend rigidity to the closure enabling it to be forced up the guides though yielding to the bending influence of the latter. The closure unit may be retained in raised position in any suitable manner as by friction thereof with the guides or by the fasteners 6', in engagement with complementary fastener members at the lower edge of the auto top. When it is desired to lower the closure the fasteners are released, the closure unit is lowered, the post section 49 inserted in the socket 30 and locked by turning the handle or knob 47, the rod 29 thereby becoming rigid before the locks 15 are released. This insures perfect alignment of door and main portions of the closure unit.

Where it is desired to employ a rod offset at the bottom in order to locate it adjacent the free edge of the door closure, the form shown in Figures 5 and 5ª may be employed wherein the lock bolt 44' provided with the handle 47' is shown swiveled at 45' in the uppermost section 46' of the core and operating in an inclined slot 48' in the uppermost section 49' of the shell. A spring 53' tends to hold the handle 47' in its lowermost position to render the rod flexible and undulations 52' are provided in the slot 48' to retain the handle in raised position to render the rod rigid.

The rod may also take the form shown in Figures 6 and 7 in which a tubing made of a continuous metallic strip 60, spirally wound with the lower edge of one turn telescoping into the upper edge, is employed. The upper edge of an adjacent lower turn is curved into an inturned arc as shown at 61 and the lower edge is offset outwardly at 62 to loosely engage said arc-shaped portion 61 to permit the requisite bending of the tube while maintaining the edges in engagement with each other. The sides 63 slope inwardly toward the bottom and are designed to normally fit with sufficient freedom in the top edge 61 to permit the flexing of the tube when raising the closure, yet fit with sufficient snugness to cause the tubing to become rigid when tensioned. Seated in the top of the tube is a cap piece 64 and in the bottom a round post section 65 provided with a locking lug 66 and having its upper portion 67 squared. Located between the shoulder formed by the junction of the main and squared portions and the bottom edge of the spiral tube is a disc 68 provided with a knob 69 and a concentric square aperture 70 adapted to fit about the squared portion 67, to prevent turning of the disc with respect to the post section 65, but permitting free sliding movement thereon. Connecting the cap piece 64 and the post section 65 and swiveled at its ends therein is a wire cable, chain, or the like laterally flexible means of constant length 71 preferably having in series therewith a short stiff tensioning spring 72. A socket 73 in which the rod and post section 65 is adapted to fit is provided in the top of the car door 5 and has a spiral and undulating slot 74 to accommodate the lug 66. When the post section is inserted in the socket and the knob 69 and disc 68 turned the post section 65 will be drawn downwardly, the squared portion 67 sliding freely in the disc aperture 70, the disc in turn seating on the socket and supporting on its upper surface the bottom of the tubing 60. The cable and spring will accordingly be tensioned and the rod rendered rigid.

In Figure 8 is shown a similar construction save that the tubular portion of the rod is not composed of a continuous strip but of individual tubular units 76 having substantially vertical sides terminating in a frusto-conical portion 77 seated in the next lower unit, two such adjacent units being provided with loosely interlocking ledges 78 and 79 respectively.

When the form of rod shown in Figures 6 and 8 are employed the door closure is preferably attached thereto at the base only the upper end of the rod being free to reciprocate in a vertical pocket near the free edge of the door closure and if desired through a sleeve on the horizontal frame member 17 to permit change of length of the rod without distorting the closure when the rod is changed from rigid to flexible condition and vice versa.

The rods heretofore described are preferably so attached to the closure as to require no separate manipulation to locate them with respect thereto when the closure is moved to lowered or operative position. As shown in Figure 9 I may, however, employ a rigid rod 80 permanently attached to the closure as by a pivot 81, preferably through its metal reinforcement, if such be employed, a U-shaped metal clip 82 or the like opening inwardly being provided at the lower free end of the closure, to retain the rod in engagement with the base of the closure when the rod is turned downwardly about its pivot to its vertical or operative position. A clip 83 preferably opening upwardly, located adjacent the upper hinged end of the closure may be employed to support the rod in its elevated or storage position indicated by the dotted line $m$. In this position the rod lies horizontally between the guideways and offers no resistance to the flexing of the closure when being raised to storage position. The clips 82 and 83 may conveniently be struck out integrally with the metal door frame reinforcement and then bent to shape.

In Figure 10 are illustrated the frames for a two unit closure for a vehicle having permanent vertical guideways M and N at front and rear, built in the top structure, as shown in dotted lines. Here, since the leg C' of unit $6^a$ is within the guideway M, rendering it less convenient to fasten down its lower end, this leg may be permitted to ride freely in the guideway and the corresponding door end of the unit be anchored down through a flexible-rigid post $29^a$ locked at its lower end in the door, similar to the post 29 employed at the free edge. If preferred, the post $29^a$ may be omitted or a rectangular door frame with vertical end members of the character shown in Figure 2 be used instead, the door closure being attached by a suitable fastener to the car door adjacent the hinge, or, if desired, the leg C' may be attached to the car body or guide by means controlled from the outside of the latter. The use of two posts has, however, the advantage that in lowering the unit the knobs 47 (Fig. $3^a$) will serve as handles and the unit can be locked down at both ends simultaneously by similar operations performed by the two hands. Since, as shown, the vertical end frame members of the door closure are conveniently omitted in this case, it is particularly desirable that the horizontal frame members F be attached to the posts at front and rear, as by welding. Units $7^a$ and $8^a$ in this form are shown as combined in one and may conveniently be constructed in a manner similar to unit $6^a$. The units $6^a$ and $7^a$ overlap and are preferably secured to the car body at their overlapping ends as by ordinary fasteners $6^x$. Similarly the other end of the frame unit $7^a$, $8^a$ is attached to the car body at $7^x$. Preliminary to moving to storage position the door closures are locked to the main portions by locks 15 as hereinbefore set forth.

In Figure 11 is shown a single unit closure for an entire side, having an integral frame 17'. Any other divison into units may be employed as for instance a two unit closure in which the door portions are located in the same unit and the rear unit is made separate therefrom.

The door closures may be entirely independent of and separate from the other side closures as illustrated for instance in Figs. 12 to 16. In Fig. 12 the door closure $B^2$ per se is adapted to slide in a pair of guides 9 and 10 when being moved to storage position or may be lowered and locked in rigid vertical position to the car door through the flexible-rigid rods 29. In the latter position the door closure seats at the front against a flange 5'' formed on the inner side of the windshield end frame 5'; at the top against a similar flange 9' extending between and preferably integral with the pair of guideways 9 and 10 which carry said door closure, as shown in Figs 12 and $12^a$; and at the rear against the overlapping edge $b^3$ of the adjacent door. In axial alignment with the car door hinge is a ball or equivalent hinge member 19' rigidly attached by a preferably round rod to the top of the door closure frame or to the rod 29 and resting when in lowermost position upon a ledge 12$^a$ at the bottom of the guideway 9, the guideway being formed at least adjacent its lower end, with an inturned portion 9$^a$ to serve as a socket to retain the ball 19' in place when operating as a hinge member, but leaving it free to rotate. The guideway 10, which engages the free edge of the door closure B$^2$, or a small knob K thereon, when the latter is lifted, is provided either integrally or by suitable securing means with a spring tongue or latch 10'', Fig. 12$^b$, adapted to releasably hold the door closure B$^2$ in closed position and preferably designed to offer greater resistance to the opening of the door closure than to its closing. This tongue or latch cooperates with the flange 9', hinge member 19' and the guideways in directing the door closure to storage position when the latter is lifted, the latch at this time standing in front of the top edge of the closure, or the knob K thereon when employed, and directing it inwardly against the flange 9'. The door closure B$^3$ is similarly adapted to close against a top flange 10', Figures 12 and 12$^b$, extending between and preferably integral with the pair of guideways 10 which carry said door closure and is similarly provided with a ball hinge 19' and a latch 10'' at its hinge and free edges respectively. However, in order to permit the door B$^3$ to turn freely about its hinge 19' without interference with the flange 10' while still affording a weather overlap with the door B$^2$, the adjacent upper corner of the door closure B$^3$ is cut away beyond the axis of the hinge as shown at 10''' in Figs. 12 and 12$^b$. The front edge of the door closure B$^3$ effects a weather overlap with the rear closure as shown in Figs. 12 and 12$^c$ and the rear guide 9 for the latter closure is shown in Fig. 12$^d$.

In Fig. 13 is shown a frame whose opposite ends 29$^c$ and 29$^d$ are of sufficient rigidity to hold the closure substantially upright when in lowered or operative position to move with the car door and of sufficient flexibility to pass longitudinally along the slightly curved guideways 9$^c$ (Fig. 14) when moving the closure to storage position and by its friction with said guideways holding the closure in the latter position. The frame member 17$^c$ is sufficiently rigid to support the members 29$^c$ and 29$^d$ in upright position and is provided with post sections 49$^c$ for engagement with the car door sockets. The complete closure is advantageously provided with anti-friction and anti-wear clips K' and when necessary to overlap a neighboring closure is undercut at 10''' to prevent interference with the flange 10' (Figs. 12 and 12$^b$) when the car door is opened, as heretofore set forth. The rod or post members 29$^c$ and 29$^d$ may if desired be independent of the frame structure, as in Figs. 3 to 9 inclusive.

Figs. 15, 15$^a$, 15$^b$ and 15$^c$ show a similar construction in which the rods or posts 29$^e$ are made of small units 32$^e$ connected by spring hinges 35$^e$ which yieldingly hold the sections in a straight line with their stop members 37$^e$ abutting each other, the section being cut away at 38$^e$ to permit forced flexing. The rods may conveniently be made of flat rectangular shape as shown in Fig. 15$^c$ and may be independent of the frame if desired.

In Fig. 16 is shown a modification of an independent door closure in which a door closure B$^4$ is swiveled or hingedly connected at 19'' to a guide frame or strip 17'' to freely rotate about a vertical axis in alignment with the car door. The door closure is adapted to be locked at its opposite end to said strip by the lock 15 when it is desired to move it to storage position. The guide frame or strip 17'' is provided with a beading 19''' adapted to engage the ledges 12$^d$ of the guideway 10$^d$ when the door closure is in lowered or operative position as shown in Fig. 16$^a$. A flange extension 12$^e$ is preferably provided below and between adjacent pairs of guideways to serve as an abutment for the strip 17'' and indirectly for the door closure B$^4$. The guide frame or strip is always in engagement with the guideways and when the door is firmly locked thereto serves to direct it to storage position. The operation of this modification is otherwise similar to that of Fig. 12.

For locking the main and door portions of a closure unit together it is preferable to employ a type of lock 15 which will not interfere with the normal closing of the door portion flush against the main portion when the closure is lowered and the lock released and which will be substantially flat when locked so as not to jam in the guideways. Such a fastener is shown in Figures 17 and 17$^a$ in which the main closure portion A is provided with a lock having a flat head or button 90 connected to a second elongated head 91 preferably by a round shank passing freely through the main closure portion A and its frame, the locking head 91 being cammed or curved on its side connected to the shank and being adapted to normally seat in a corresponding recess or pocket in the portion A under the influence of the conical spring 92 so as to present a flat surface to the door portion when released therefrom. The door portion of the closure is provided with an elongated horizontal slot 93, as shown, preferably passing through the frame reinforcement and when it is desired to firmly lock the portions together to move the section as a unit to storage position the button 90 is pressed against the tension of its spring and turned, if necessary, to bring the locking head 91 into horizontal position, thus causing it to pass through the slot 93 and, upon further turning, the under curved or cammed portion of the locking head rides over the sides of the slot and firmly locks the parts together, indentations 94 being provided in the preferably metallically covered sides of the slot, if desired, to prevent accidental disengagement. The heads being thin and flat and the conical spring when depressed into locking position lying in substantially a flat plane the lock when engaged is of minimum thickness thus facilitating movement through the guideways. The slot while shown in horizontal position should be positioned so as to conserve to the maximum the strength of the frame reinforcement.

It is desirable that each closure unit be resiliently supported at the top to provide an adjustable fit and take up the strain while preserving the closure taut at all times. To this purpose the arrangement shown in Figure 18 may be employed in which the beading 19 of the closure is supported on a shelf or ledge 95 resiliently supported in turn by a spring 96 resting on the bottom shelf or ledge 12 of the guideways 9, 10. The shelf 95 carries pins 95′ projecting into a slot 97 in the closed sides of the guideways 9, 10 at each end of a closure unit to maintain itself in proper position and it is further provided at its lower end with an outturned edge 98 opposite a similar outturned edge at the lower end of the guideway to prevent interference with the closure when being raised. In Figures 18$^a$ and 18$^b$ are shown beadings resilient within themselves. In the former figure the beading 19$^m$ consists of an outer shell resiliently tensioned by springs 96$^m$ bearing at one end on the lower inturned ends of the shell and at the other end against the head 95$^m$ formed on the member 17 of the closure unit and adapted to seat on the ledges 12′ of the guideway. In Figure 18$^b$ the beading consists of shell 19$^n$ tensioned by a single spring 96$^n$ bearing against the head 95$^n$ of the member 17 of the closure the latter being guided between the adjacent overlapping ends $r$, $s$ of the shell, and the head 95$^n$ being similarly guided between the sides of said shell. In Figure 19 is shown a closure with beading 19 provided with flattened end extensions 19$^x$ adapted to rest upon a shelf 95$^x$ supported by a spring 96$^x$ upon the ledges 12$^x$ at the lower corners of the guideways. The shelf 95$^x$ is restricted to vertical reciprocatory movement by forming it of a strip bent as shown. This strip is sufficiently narrower than the guideway to permit its parts to slide freely therein while being guided thereby and by the end member $n$ of the guideway lying between the parallel members $m$ and $p$ of the strip and by the ledge 12$^x$ lying between the parallel members $o$ and $p$ of the strip. The overlapping ends of the beading of adjacent units may be flattened as at 19$^n$ in Figure 20, to permit close fitting of the closures and easy passage through the guideways.

As shown in Figure 21, the guideways and shelves or ledges together with the closures themselves may be conveniently designed as features of a self-contained closure unit comprising a compartment 100 having a top and bottom consisting of continuous sheets of thin, light, rigid, smooth material of the character hereinbefore indicated between which the closures are adapted to slide. The guideways 9 and 10 where necessary may be appropriatey secured within this compartment but the guideways 9 may be dispensed with if desired, the ends of the compartment serving as guideways. The bottom sheet of the compartment may be extended at one or both ends, if necessary, as shown at 101 in Figures 21 and 23 to complete the ceiling and give a finished appearance or it may be omitted as in Figure 22. If desired the top sheet may be omitted to save at the curved sides of the compartment, as shown at 102 in Figure 21$^a$, where it is preferably employed to prevent buckling of the closures midway the guides and the interference of obstructions when the closures are being forced through the curved portions of the guideways. Where cheapness of construction is a vital factor the compartment may comprise merely the guideways 9 and 10 interconnected by the ledges 12 and preferably having attached to their underside a fabric lining. The ledges are shown in Figures 22 and 23 as formed by striking out overlapping slots, corresponding to the overlapping guideways and end guideways, in a metal cap piece 103, the slots being indicated respectively 104′, 104″ and 104‴. Slots 104′ and 104″ are provided with enlargements 105 to accommodate the door rods and the cap piece may be secured to the compartment by soft rivets 106 which permit its removal for the repair of parts. Where an open top is employed as in Figure 21$^a$ the cap piece is preferably permanently attached and the guideways preferably welded thereto, thereby strengthening the structure. The self-contained compartments are shown as provided with clamps 107 for removably and adjustably attaching them to the frame of the vehicle, one half of the clamp, only, being shown. Tabs 108 may be employed to facilitate pulling down of the closures and also carrying fasteners if desired, to lock the closures in raised position as shown in Fig. 22. The closures may also be designed so that their lower edge in raised position will rest upon the ledges 12, thus retaining them raised.

As shown in Figures 24 and 25, spring rollers 109, 109′ arranged in the longitudinal axis of the top and attached by flexible strips 110 and 110′ respectively to the closures may be employed to lift the closures and retain them in elevated position and to tension them when fastened in lowered position.

Where the width of the top is insufficient to accommodate two closures from opposite sides with their upper ends edge to edge, overlapping guideways and compartments may be employed, as shown at 111, 111' in Figure 26.

In Figs. 27, 28 and 29 the compartment is shown as made in three sections, 120, 121 and 122, each a complete compartment for an individual closure unit on each side. The sections overlap at their ends in order to guide adjacent closures into overlapping relationship when lowered. The closures when in storage would occupy the space above the dotted lines 123 in sections 120 and 121 in Fig. 27 and if desired a light supporting shelf may be located in the position of these lines. The rear compartment may conveniently be locked to the rear bow 124 by bracket sockets 125, fixed on the latter, to cooperate with bracket hook or ball members 126, fixed on the rear section, (Figs. 28 and 29) the socket member 125 having an extension or stop 125' to guide the hook or ball member 126 when the rear section is tilted downwardly at its forward end in the process of mounting it in the top. When the bracket members become interlocked and the front end of the rear section is raised the extension or stop 125' bears on the stem of the hook or ball projection 126 to lock the latter in the socket. The outer forward edges of the rear section 122 when raised are conveniently automatically locked to the side bars 127, of the top by spring catches 128 preferably welded or riveted at one end to the side bars and carrying at their free ends shoulders 129 having outwardly inclined portions 130 projecting therefrom, the shoulders being adapted to spring under the edges of the section, or of shoulders or lugs 131 formed thereon, to securely hold the forward end of the section raised. The inclined portions 130 by sliding engagement with the section while the latter is being raised are pressed outwards and automatically retract the shoulders 129 (Fig. 31). Finger pieces 132 are provided for releasing the shoulders when it is desired to remove the section. In Fig. 30 the catch is shown double to insure against accidental breakage of one of its members, a single operating finger piece 133 serving to simultaneously operate both members, and the side bar 127 is conveniently recessed at 134 to receive the shoulder 129 when pressed towards it. The middle section 121 is conveniently mounted by inserting its reduced rear end 135 in the recess 136 formed in the end of the rear section, both reduced end and recess preferably being continuous from side to side of the sections. The forward end of the middle section is conveniently secured to the side bars 127 by catches 128, as described for the preceding section. The reduced rear end of the forward section 120 is inserted in the forward recessed end of the middle section and its forward end is conveniently provided with spring pressed latches 137 which, when said end is raised, automatically engage the recesses 138 in the front frame member 139 of the top. These latches are provided with knobs 140 by which they may be retracted when it is desired to remove the sections. Buffer and slack-take-up pads 141 are preferably provided on the forward edge of the front section and on the tops of all the sections and the frame member 139 is advantageously provided with spring pressed plungers 142 also to aid in firmly holding the sections together and prevent play. In lieu of connecting adjacent sections by the reduced ends 135 and recesses 136 they may be connected by projections 143 on the rear sections engaging recesses 144 under the closures in the adjacent forward sections, as shown in Fig. 27.

Figure 32:
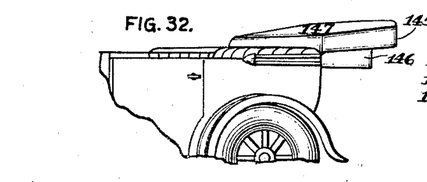
Figs. 32, 33 and 34 show the manner of nesting the sections of the sectional compartment and storing them in a pocket provided in the casing employed to cover the lowered top.
Figures 33, 34:
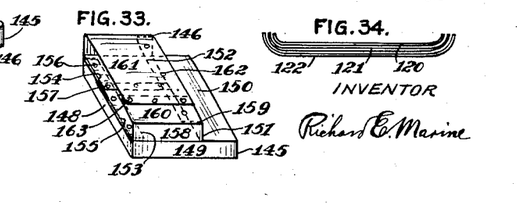

When the sections are dismounted they are nested as shown in Fig. 34 and placed in the pocket 145 built integral with the usual casing 146 used to cover the top when lowered (Fig. 32). The combined cover and pocket (Fig. 33) conveniently comprises a pocket compartment having permanent top 147, sides 148 and ends 149, forming a boxlike receptacle. The portion 150 of the pocket bottom is preferably also permanently attached to the ends and rear side and continued upwardly at 151 to constitute the permanent rear end of the casing 146 and then carried inwardly to form the free flap 152 of the casing member. The front side 148 of the pocket is preferably extended into a free flap 153, and overlapping flaps 154 and 155 attached respectively to the ends 149 overlie the flap 153 being secured thereto by the fasteners 156 and having their own free ends secured together by the fasteners 157 to retain the nested sections 120, 121, and 122 when placed therein. Portions of the ends of the pocket are conveniently extended upwardly as shown at 158, their rear edges being attached to the member 151 up to the point 159, and then extended into free overlapping flaps 160, 161 attachable to the free flap 152 by fasteners, 162 and to each other by the fasteners 163. When the free flaps 160, 161 and 152 are unfastened the cover may be readily slipped over the lowered top and the flaps carried thereunder and snapped together in the manner indicated. It is obvious that the casing and pocket may be made separately and afterwards connected together or their construction may be varied in other obvious ways within the spirit of my invention.

The invention as hereinbefore set forth is embodied in particular forms of constructions but may be variously embodied and some features of the invention may sometimes be used to advantage without a corresponding use of other features.

I claim:

1. In a closure structure for vehicles and the like, provided with a body having a door in the side thereof and a top, in combination: a closure, storage means therefor in said top, and control instrumentalities associated therewith to effect the sliding of said closure from its position in storage to its operative position and permitting at least a portion thereof when in the latter position to freely turn with said doors, and further effecting return of said closure, when lifted, to storage position.

2. In a closure structure for vehicles, or the like, in combination: a closure member comprising a main portion and a door portion, storage instrumentalities for said closure, said closure adapted to slide as a unit into storage position or into operative position and when slid into operative position permitting said door portion to move with the door of the vehicle independently of said main portion.

3. The combination as defined in claim 2 in which storage is provided in the car top and in which the main closure portion is retained at its top by the storage instrumentalities when the closure is lowered.

4. The combination as defined in claim 2 in which the main portion and the door portion are made of flexible material, reinforced by resilient frame members, means being provided for locking said portions firmly together through said frame members.

5. The combination as defined in claim 1 in which a flexible closure is employed, said closure being provided with means for retaining it in substantially rigid, upright position on the door when it is in its operative position but permitting it to flex in passing to storage position.

6. In a closure device for vehicles and the like in combination: a flexible closure; a member attached thereto and movable therewith in a curved pathway into storage position, or from storage position into operative position and in the latter position supporting said closure in substantially rigid upright position.

7. In a closure device for vehicles, or the like, a rod adapted to be attached to a flexible closure and being itself normally flexible, said rod being provided with means for rendering it rigid at will.

8. In a closure device for vehicles, or the like, a normally flexible rod; a member of the vehicle to which said rod is adapted to be rigidly attached; and means for simultaneously securing said rod to said member and rendering it rigid.

9. A side closure for a vehicle provided with a yieldingly resilient beading on one edge to maintain said closure taut and prevent vibration and rattling when said closure is secured at an opposite edge; and means on the vehicle proper for engaging said beading to resiliently support said closure at said edge.

10. A side closure for a vehicle; means on said vehicle for retaining one edge of said closure, and yielding elastic means associated with said means and said edge of the closure for rendering said closure taut and free of vibration when the closure is secured at the opposite edge.

11. A storage structure for side closures of vehicles and the like, adapted to fit in the top thereof, comprising individual sections for corresponding closures on opposite sides of the vehicle, said sections being arranged in overlapping series, and guideways for the closures located in the overlapping portions.

12. A storage structure for side closures of vehicles and the like, adapted to fit in the top thereof, comprising an imperforate waterproof casing for said closures, constituting in effect an inner top to which the closures are fitted and serving with the latter to give weatherproof protection to the occupants of the car and to insulate against heat and protect against leakages in the outer roof.

13. A removable sectional structure for side closures of vehicles or the like, adapted to fit in the top thereof, comprising an end section provided adjacent its opposite ends with means for securing it to the top structure; and a second separate section removably secured at one end to the first section and at its other end to the vehicle top.

14. A removable sectioned structure for the storage of side closures of vehicles and adapted to be attached under the vehicle top, comprising separate sections for the respective closure units on the same side of the vehicle, said sections being adapted to be mounted under the vehicle top in overlapping succession.

15. The combination as defined in claim 1 in which a plurality of adjacent closures are employed and in which overlapping guideways are provided under the vehicle top through which the closures are adapted to slide.

16. The combination as defined in claim 1 in which a plurality of adjacent closures are employed and in which overlapping guideways are provided under the vehicle top through which the closures are adapted to slide, said guideways serving to direct said closures into weather overlapping position with regard to each other and with regard to the stationary end members at the respective ends of the top.

17. In a closure structure for vehicles, guideways for the closures under the vehicle top having curved portions adjacent the sides of said top and a curved shield conforming to the upper surfaces of the guideways adjacent their curved portions only to prevent buckling of the closure in sliding to and from storage position.

18. The combination as defined in claim 2 in which the main portion and the door portion are provided with means for locking said portions together for movement to and from storage position.

19. The combination as defined in claim 2 in which the main portion is of inverted U-shape between the legs of which said door portion is carried.

20. A vehicle closure comprising a main portion and a door portion each of flexible material reinforced by resilient frame members directly hinged together.

21. In combination, a vehicle closure having adjacent its upper edge an enlarged portion to constitute a stop and a guideway in the top of the vehicle having a ledge at its lower end for engagement by said stop to retain said closure in operative position when lowered.

22. A rod for automobile closures and the like comprising a member composed of a plurality of sections and a second member adjacent thereto, also composed of a plurality of sections; the sections of the respective members being relatively movable to one position to permit the rod to flex and to a second position to render the rod substantially rigid.

23. A rod for automobile closures and the like comprising an outer shell of serially hinged sections and an inner core of serially hinged sections; the axes of the hinges of the respective outer and inner sections being adapted to be brought into substantial alignment to permit the rod to flex and to be moved out of alignment to render the rod substantially rigid.

24. The combination as defined by claim 22 in which the sections of the respective members are normally biased to a position to render the rod flexible and means for moving them relatively to each other to render the rod rigid.

25. In the combination defined by claim 23 means for moving the axes of the hinges of the respective outer and inner sections out of alignment to render the rod substantially rigid and for simultaneously locking said rod to the door.

26. A rod for automobile closures and the like comprising a member having portions movable relative to each other and a second member movable to one position to lock said portions against relative movement thereby rendering said rod substantially rigid and movable to a second position to release said portions and permit said rod to flex.

27. In the combination defined by claim 26 means for moving said second member to a position to lock said movable portions of said first member against relative movement and for simultaneously locking the end of said rod to a door.

28. A storage structure for side closures of vehicles, adapted to fit in the top thereof, comprising sections arranged in overlapping series, the overlapping portions forming overlapping guideways for adjacent closures.

29. A storage structure for the side closures of vehicles, adapted to fit in the top thereof, comprising a casing providing a storage space which stops short of the end of the top, said casing being extended on at least one surface into substantial engagement with the corresponding end of the top frame.

30. In the combination defined in claim 14, means for maintaining the several sections in firm contact with each other and with the vehicle top construction.

31. A removable sectioned structure for the storage of the side closures of vehicles, adapted to be attached to the under side of the vehicle top, and means acting automatically to lock said sections in place upon properly positioning them.

32. A locking device for securing the side of a closure section to the top side rail of a vehicle comprising a spring member attached to one of said parts and provided with a shoulder portion for engagement with the other of said parts and an inclined extension from said shoulder to serve as the retracting means when engaged by the other of said parts and also as a hand-releasing means.

33. A pair of locking devices of the character defined in claim 32 arranged side by side with overlapping inclined extensions to permit both to be operated by a single manipulation.

34. In a vehicle, or the like, provided with a top and movable closures, a storage structure for said closures adapted to fit under the top and serve as the inner lining thereof, said storage structure being composed of a phenol condensation product.

35. In a closure device for vehicles, or the like, a normally flexible rod adapted to move longitudinally in a curved pathway; a socket for the side of said vehicle; and means for simultaneously securing said rod in said socket and rendering it rigid.

36. In a closure structure for vehicles, or the like, provided with a body having a pair of doors in a side thereof and a top, in combination: a pair of closures; storage means therefor in said top; and control instrumentalities associated therewith to effect the sliding of said closures, when lowered, from storage position to operative, weather-overlapping positions while retaining a hinged engagement with one of the upper ends of each of the closures to permit each closure to turn, as a whole, with its corresponding door, and further effecting return of said closures, when lifted, to storage position.

37. In a closure structure for vehicles, or the like, provided with a body having a door in a side thereof and a top, in combination: a closure; storage means therefor in said top; and control instrumentalities associated therewith to effect the sliding of said closure, when lowered, from storage position to operative position while retaining a hinged engagement with one of the upper ends of the closure to permit the closure to turn, as a whole, with the door, and further effecting return of said closure, when lifted, to storage position, and means yieldably engaging the opposite upper end of said closure to normally retain it in place.

38. In a closure structure for vehicles, or the like, provided with a body having a door in a side thereof and a top, in combination: a closure; storage means therefor in said top; and control instrumentalities associated therewith to effect the sliding of said closure, when lowered, from storage position to operative position while retaining a hinged engagement with one of the upper ends of the closure to permit the closure to turn, as a whole, with the door, and further effecting return of said closure, when lifted, to storage position.

39. A closure member for vehicles having sections resiliently held together to permit sliding of said member longitudinally through a curved pathway, but capable of maintaining the closure in substantially rigid, operative, upright position.

40. A closure frame for vehicles having its vertical members of sufficient resiliency to permit their sliding longitudinally in a curved pathway but of sufficient stiffness to support the closure in opertive upright position.

41. A closure member for vehicles of sufficient resiliency to permit its sliding longitudinally through a curved pathway but of sufficient stiffness to support the closure in substantially rigid, operative, upright position.

42. In a closure construction for vehicles and the like, in combination: a flexible closure; a rigid rod pivoted thereto and movable into a horizontal position thereon, or into a vertical position to support said closure rigidly upright, said rod in the latter position extending below the bottom of the closure for insertion in a door socket.

43. In a closure construction for vehicles and the like, in combination: a flexible closure; a rigid rod pivoted thereto and movable into a horizontal position thereon, or into a vertical position to support said closure rigidly upright.

In testimony whereof I affix my signature.

RICHARD E. MARINE.